US008254845B2

(12) United States Patent
Na et al.

(10) Patent No.: US 8,254,845 B2
(45) Date of Patent: Aug. 28, 2012

(54) COMBINED BEAMFORMING AND NULLING TO COMBAT CO-CHANNEL INTERFERENCE

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 499 days.

(21) Appl. No.: 12/503,268

(22) Filed: Jul. 15, 2009

(65) Prior Publication Data

US 2011/0012787 A1 Jan. 20, 2011

(51) Int. Cl.
*H04B 1/00* (2006.01)
*H04B 15/00* (2006.01)

(52) U.S. Cl. ...................................... 455/63.4; 375/341

(58) Field of Classification Search ................. 455/63.1, 455/63.4, 65, 66.1, 67.11, 67.13, 67.14; 375/341, 375/261, 262
See application file for complete search history.

(56) References Cited

U.S. PATENT DOCUMENTS

| | | | |
|---|---|---|---|
| 6,970,722 B1 | 11/2005 | Lewis | |
| 7,539,273 B2 * | 5/2009 | Struckman | 375/341 |
| 2009/0004988 A1 | 1/2009 | Jin et al. | |
| 2010/0157861 A1 | 6/2010 | Na et al. | |

* cited by examiner

*Primary Examiner* — Ping Hsieh
(74) *Attorney, Agent, or Firm* — Edell, Shapiro & Finnan, LLC

(57) ABSTRACT

Techniques are provided to improve receive beamforming at a wireless communication device that receives energy in a frequency band at M plurality of antennas, where the received energy includes desired signals and interference signals. The wireless communication device has no knowledge of the spatial signatures of the desired signals and interference signals. A weighted sum signal vector is computed from the received signals and a covariance matrix is computed from the receive signals. Eigenvalue decomposition of the covariance matrix is computed to obtain M eigenvalues of corresponding M eigenvectors of the covariance matrix. A correlation rate is computed between the M eigenvectors and the weighted sum signal vector. A combined receive beamforming and nulling weight vector is computed from the M eigenvectors and the weighted sum signal vector and based further on the correlation rate. The combined receive beamforming and nulling weight vector is applied to the received signals so as to receive beamform the desired signals and null out the interference signals.

26 Claims, 6 Drawing Sheets

COMBINED BEAMFORMING AND NULLING TO COMBAT CO-CHANNEL INTERFERENCE

TECHNICAL FIELD

The present disclosure relates to wireless communication devices and systems and more particularly to improving performance in multi-cellular wireless communication networks.

BACKGROUND

In wireless communication systems, antenna arrays are useful to suppress multipath and interference through spatial filtering or beamforming/nulling operations. Spatial filtering or beamforming/nulling is particularly useful in networks with relatively high frequency reuse configurations, such as a frequency reuse factor of 1 or 2, where co-channel interference can be a dominant adverse effect on system performance. A goal of spatial filtering is to achieve an optimal combining, or beamforming, of the desired signals and at the same time suppress, or null out, the interference(s).

Many known spatial filtering techniques rely on knowledge of the directions of both the desired signal and the interference(s), and that the desired signal and interference have uncorrelated channels. This is hardly true in real-world system deployments. For example, in a multipath environment it is very likely that the directions of the desired signal and interference are not known and furthermore that their channels are highly correlated as a result of the multipath environment.

DESCRIPTION OF EXAMPLE EMBODIMENTS

Overview

Techniques are provided herein to improve receive beamforming at a wireless communication device that receives energy in a frequency band at M plurality of antennas, where the received energy includes desired signals and interference signals. The wireless communication device has no knowledge of the spatial signatures of the desired signals and interference signals. A weighted sum signal vector is computed from the received signals and a covariance matrix is computed from the receive signals. Eigenvalue decomposition of the covariance matrix is computed to obtain M eigenvalues of corresponding M eigenvectors of the covariance matrix. A correlation rate is computed between the M eigenvectors and the weighted sum signal vector. A combined receive beamforming and nulling weight vector is computed from the M eigenvectors and the weighted sum signal vector and based further on the correlation rate. The combined receive beamforming and nulling weight vector is applied to the received signals so as to receive beamform the desired signals and null out the interference signals. The aforementioned blind spatial filtering scheme makes no assumption on the directions of the desired signal and interference(s) and how the channels of the desired signal and the interference are correlated.

Example Embodiments

Figure 1:
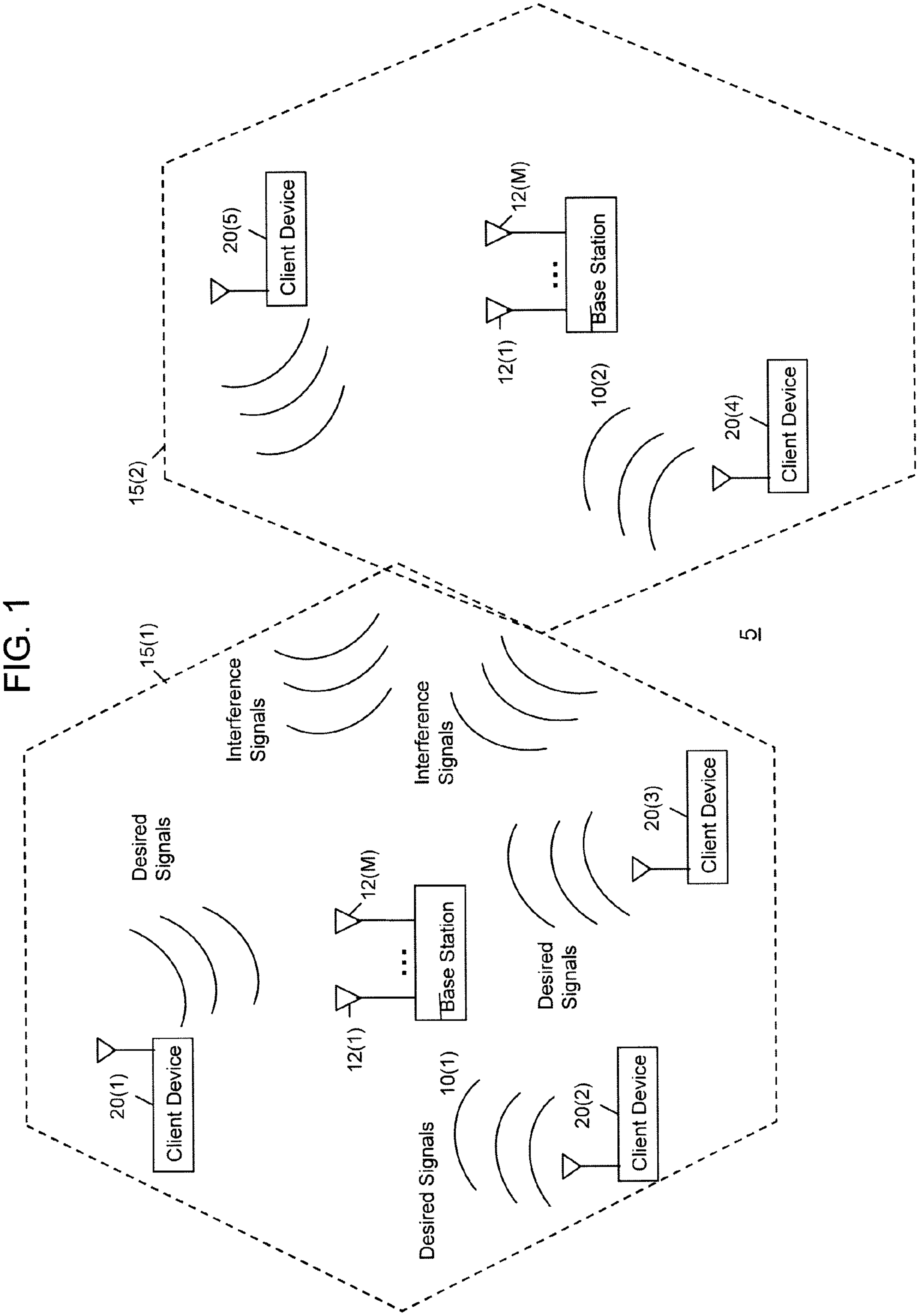
FIG. 1 is block diagram illustrating two adjacent cells that operate in the same frequency band in a multi-cellular wireless communication network in which base stations serving the respective cells are configured to perform combined receive beamforming and nulling techniques described herein.

Referring first to FIG. 1, a wireless communication network is shown at reference numeral 5. The network 5 is a multi-cell network comprising a plurality of wireless base stations, and in this example, base stations 10(1) and 10(2), each of which serves a corresponding cell or coverage area where client devices are located. For example, base station 10(1) serves cell 15(1) where (in this simplified example) there are three client devices 20(1), 20(2) and 20(3), and base station 10(2) serves adjacent cell 15(2) where there are two client devices 20(4) and 20(5). In the example shown in FIG. 1, each base station 10(1) and 10(2) comprises M plurality of antennas 12(1)-12(M) and each client device comprises one antenna that it uses for transmit purposes. A client device may actually comprise multiple antennas that it uses for receive purposes, or for both transmitting and receiving signals It should be understood that each base station 10(1) and 10(2) may serve many more client devices in its coverage area. The base stations 10(1) and 10(2) may serve as a gateway for client devices to another network, i.e., the Internet.

The base stations 10(1) and 10(2) send transmissions in their respective cells and receive transmissions from client devices in their respective cells. However, due to the proximity of an adjacent cell, when an adjacent cell or otherwise nearby cell is operating on the same frequency channel, there is a high likelihood of co-channel interference. For example, as shown in FIG. 1, transmission made by client devices 20(4) and 20(5) to base station 10(2) may actually be detected by the base station 10(1) in the adjacent cell, and with respect to base station 10(1), the signals from client devices 20(4) and 20(5) are interference signals.

Moreover, in many situations, a given base station may not have knowledge of the spatial signatures of desired signals, i.e., those signals that are transmitted from a client device in its cell or coverage area, and of interference signals, i.e., those signals that are transmitted from a device outside of its cell (from a client device or another base station). To this end, techniques are provided herein to configure a base station, e.g., base stations 10(1) and 10(2), to perform a blind spatial filtering scheme that operates as a combined receive beamforming and nulling process in order to receive beamform the desired signals while nulling out the interference signals.

Figure 2:
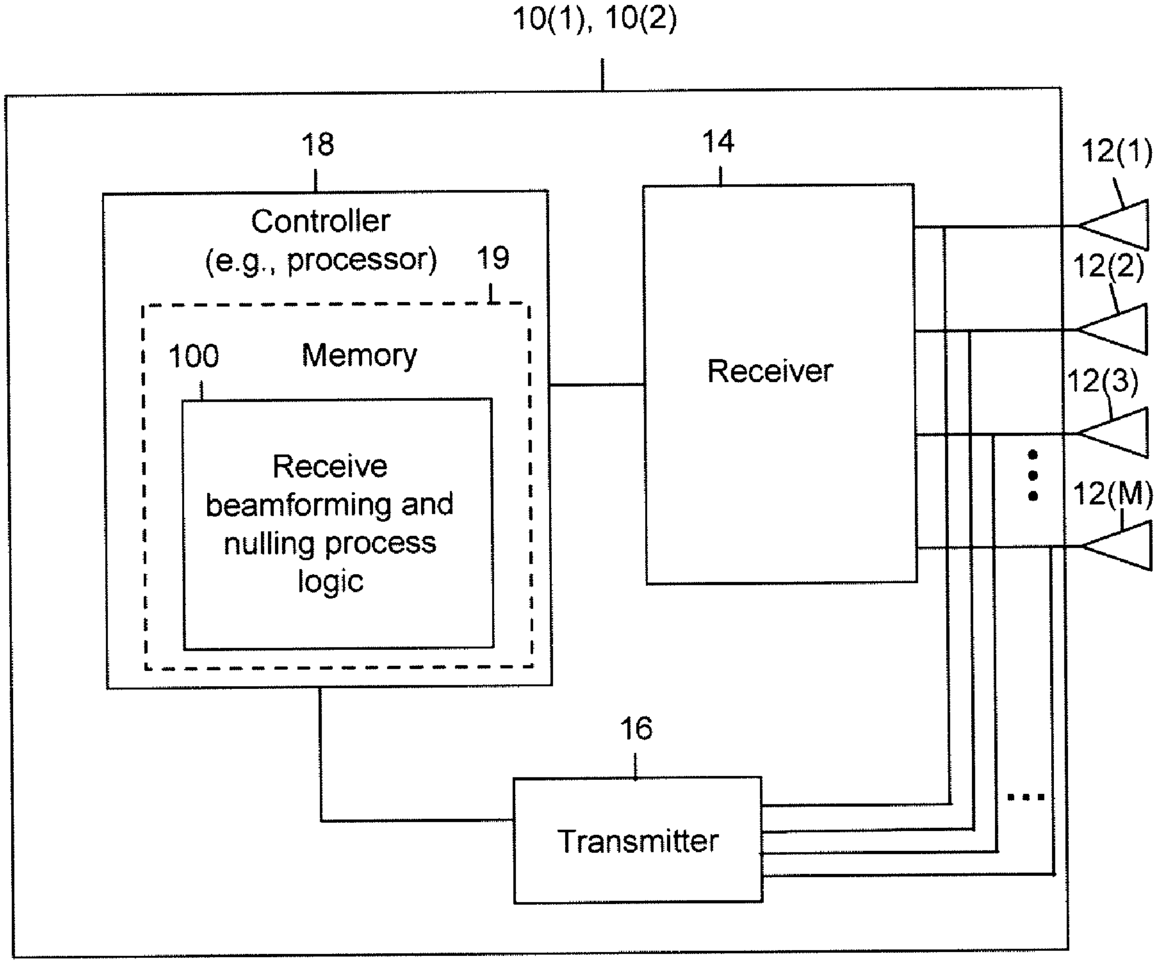
FIG. 2 is a block diagram of a wireless communication device, e.g., a base station, that is configured to perform the combined receive beamforming and nulling process.

Reference is now made to FIG. 2 for a description of a wireless communication device, e.g., base station 10(1) or 10(2), that is configured or equipped to perform the aforementioned combined receive beamforming and nulling process. The base station comprises a receiver 14, a transmitter 16 and a controller 18. The controller 18 supplies data to the transmitter 16 to be transmitted and processes signals received by the receiver 14. In addition, the controller 16 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 is, for example, a signal or data processor that comprises a memory 19 or other data storage block that stores data used for the techniques described herein. The memory 19 may be separate or part of the controller 18. Instructions associated with receive beamforming and nulling process logic 100 may be stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100.

Figure 3:
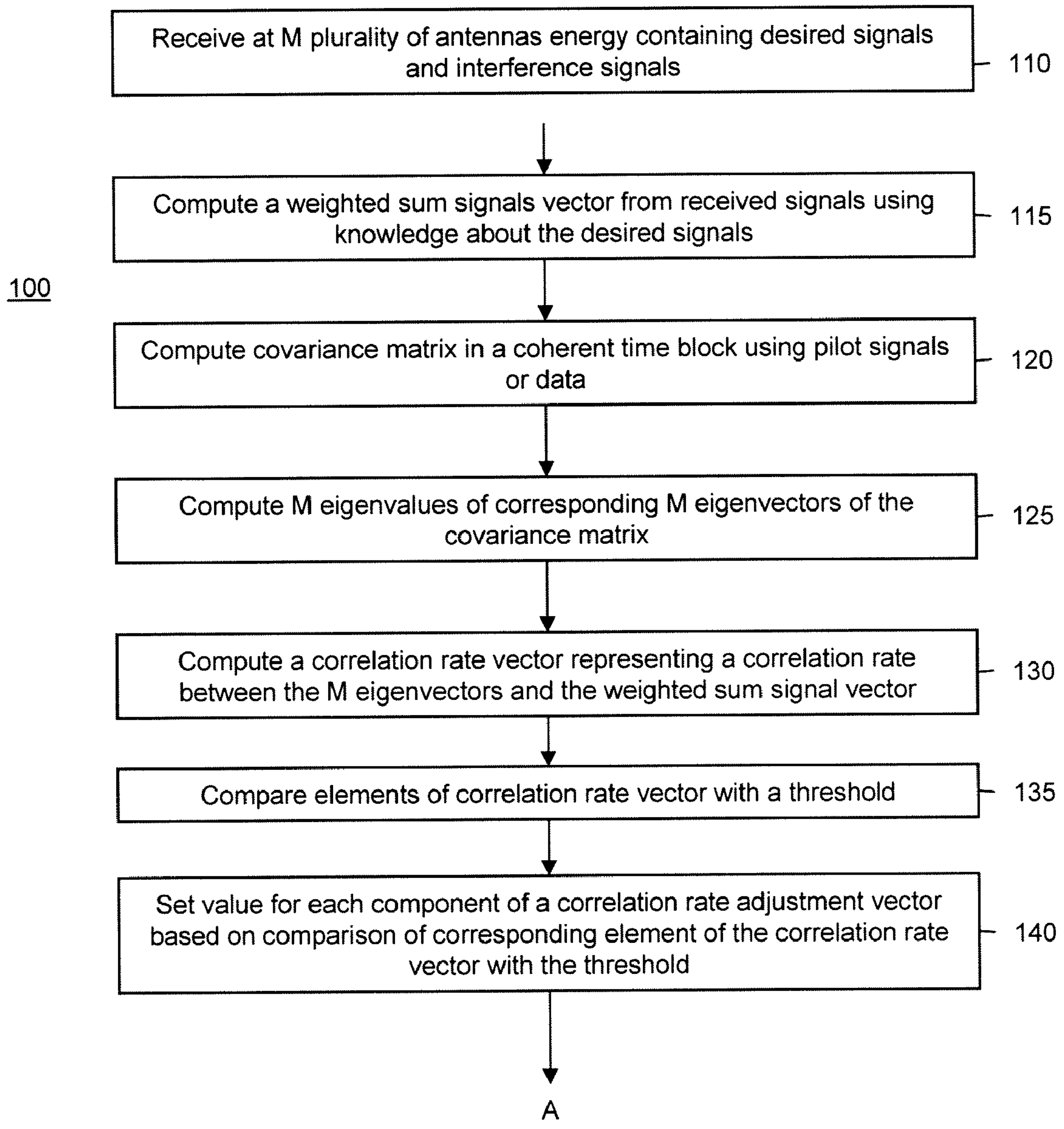
FIGS. 3 and 4 illustrate a flow chart for the combined receive beamforming and nulling process logic.
Figure 4:
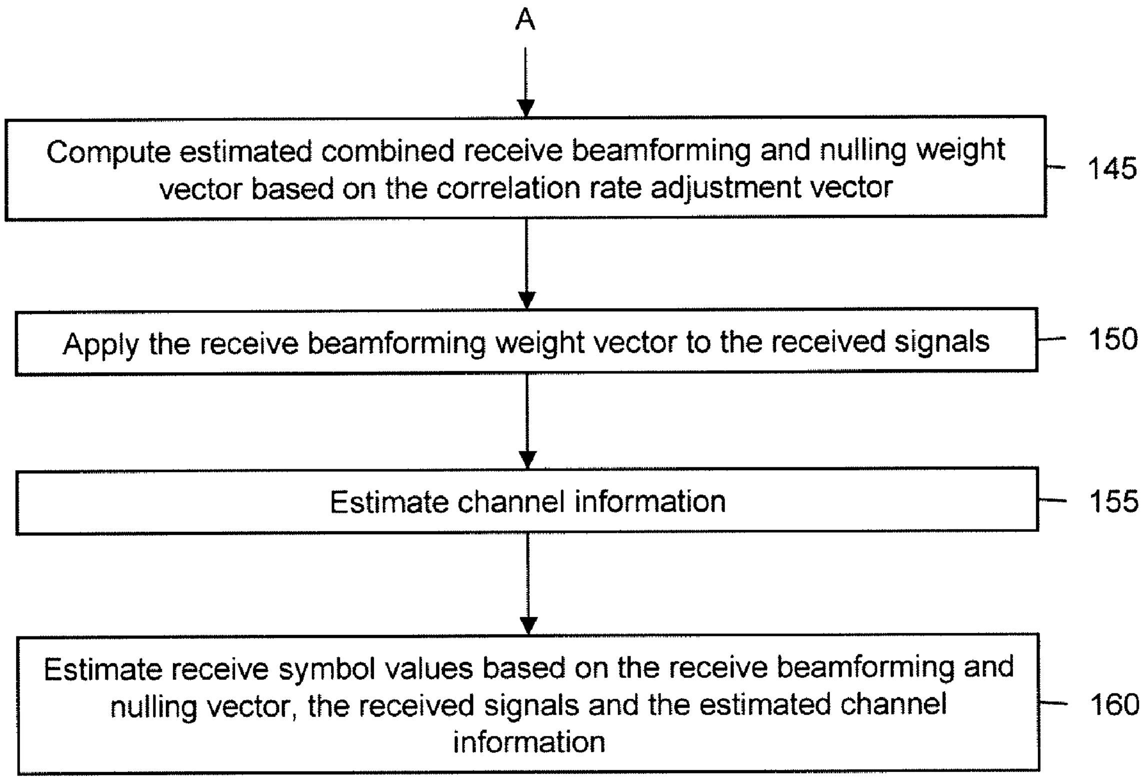

Turning now to FIGS. 3 and 4, the process logic 100 is described in more detail. At 110, energy is received at the M plurality of antennas (of a base station, e.g., base station 10(1) or 10(2)) and this energy contains desired signals and interference signals. The base station receives this energy without knowledge of the spatial signatures of the desired signals and interference signals. For example, the base station may not know the location a client device within its cell that is sending signals to the base station. Client devices may move from time to time and at any given instant, the base station may not know its location and consequently its spatial signature.

Moreover, in a multipath wireless environment, it is very difficult to distinguish a spatial signature associated with a line-of-sight path versus reflected paths created in the multipath environment due to obstacles. In addition, a base station will not know the spatial signature of interference signals, i.e., those signals from devices outside of its cell. Consequently, a beamforming and nulling process that does not rely on knowledge of the spatial signatures of the desired signals and interference signals has substantial value in real-world applications.

The received signals (desired signals from a client device in the base station's cell and interference signals from one or more client devices or base station devices in another cell) produced from the energy received at the M antennas of the base station may denoted as:

$$Y = [\,Y_1 \quad Y_2 \quad \cdots \quad Y_M\,]^T = \begin{bmatrix} y_{1,1} & y_{1,2} & \cdots & y_{1,N} \\ y_{2,1} & y_{2,2} & \cdots & y_{2,N} \\ \vdots & \vdots & \ddots & \vdots \\ y_{M,1} & y_{M,2} & \cdots & y_{M,N} \end{bmatrix} = \begin{bmatrix} h_{1,1,1}d_{1,1} + h_{2,1,1}d_{2,1} + z_{1,1} & h_{1,1,2}d_{1,2} + h_{2,1,2}d_{2,2} + z_{1,2} & \cdots & h_{1,1,N}d_{1,N} + h_{2,1,N}d_{2,N} + z_{1,N} \\ h_{1,2,1}d_{1,1} + h_{2,2,1}d_{2,1} + z_{2,1} & h_{1,2,2}d_{1,2} + h_{2,2,2}d_{2,2} + z_{2,2} & \cdots & h_{1,2,N}d_{1,N} + h_{2,2,N}d_{2,N} + z_{2,N} \\ \vdots & \vdots & \ddots & \vdots \\ h_{1,M,1}d_{1,1} + h_{2,M,1}d_{2,1} + z_{M,1} & h_{1,M,2}d_{1,2} + h_{2,M,2}d_{2,2} + z_{M,2} & \cdots & h_{1,M,N}d_{1,N} + h_{2,M,N}d_{2,N} + z_{M,N} \end{bmatrix}$$

where N is the number of received signals in a coherence block (a slot of the coherent frequency band and coherent time period), $$H_1 = \begin{bmatrix} h_{1,1,1} & h_{1,1,2} & \cdots & h_{1,1,N} \\ h_{1,2,1} & h_{1,2,2} & \cdots & h_{1,2,N} \\ \vdots & \vdots & \cdots & \vdots \\ h_{1,M,1} & h_{1,M,2} & \cdots & h_{1,M,N} \end{bmatrix}$$

and $$H_2 = \begin{bmatrix} h_{2,1,1} & h_{2,1,2} & \cdots & h_{2,1,N} \\ h_{2,2,1} & h_{2,2,2} & \cdots & h_{2,2,N} \\ \vdots & \vdots & \cdots & \vdots \\ h_{2,M,1} & h_{2,M,2} & \cdots & h_{2,M,N} \end{bmatrix}$$

are the channel information for a user 1 which is the desired client device and user 2 which is the interference user, and $d_1=[d_{1,1}\ d_{1,2}\ \ldots\ d_{1,N}]$ and $d_2=[d_{2,1}\ d_{2,2}\ \ldots\ d_{2,N}]$ are the transmitted signals for the user 1 and user 2, respectively, and $$Z = \begin{bmatrix} z_{1,1} & z_{1,2} & \cdots & z_{1,N} \\ z_{2,1} & z_{2,2} & \cdots & z_{2,N} \\ \vdots & \vdots & \ddots & \vdots \\ z_{M,1} & z_{M,2} & \cdots & z_{M,N} \end{bmatrix}$$

is a matrix of white noise in discrete received signals.

In the received signals Y, the desired signals (from user 1) and interference signals (from user 2) are overlapped in frequency and time. In the case of the desired signals, the base station knows the positions (i.e., subcarrier positions in an orthogonal frequency division multiplexed system) and values of pilot signals transmitted by its client device. The base station does not have such information about the interference signals. In addition, the base station does not know the spatial signature of the desired signals and of the interference signals. To improve system performance, the client devices may use more pilot signals, e.g., more pilot subcarriers, in their transmissions.

At 115, a weighted sum signal vector is computed from the received signals using knowledge about the desired signals. The weighted sum signal vector is a vector v in a coherent frequency band computed from pilot signals contained in a transmission from a client device or using decision feedback based on data signals recovered from a transmission from a client device. When the wireless communication system operates in a frequency selective channel, the computation to obtain the weighted sum signal vector may be made on part of a frequency band, called a coherent frequency band, in which there are minimal or no variations across frequency, such as in a tile of frequency subcarriers as defined in the IEEE 802.16 wireless communication standard, also known commercially as WiMAX™. The weighted sum vector v will have an enlarged power/feature for desired signals and reduced power for interference signals because there is a high probability that the data for desired signal and the interference signal will be different in some of subcarriers. That is, the weighted sum signal vector is computed as $v=\tilde{Y}(\tilde{d}_1)^{-1}$ or $v=\tilde{Y}(\tilde{d}_1)^H$, where $\tilde{Y}$ is the part of the received signals Y that includes the pilot signals (or pilot signals and detected data signals) and $\tilde{d}_1$ is the vector of pilot signals (or pilot signals and detected data signals recovered from the received signals). Thus, the weighted sum signals vector v is a feature vector that is computed or derived from the received signals using knowledge about the desired signals, where such knowledge is known to the base station a priori in terms of the pilot signals that are included in a transmission from a client device, or in terms of data signals that are recovered from the received signals through decision feedback processing or other data detection or recovery techniques.

Figure 5:
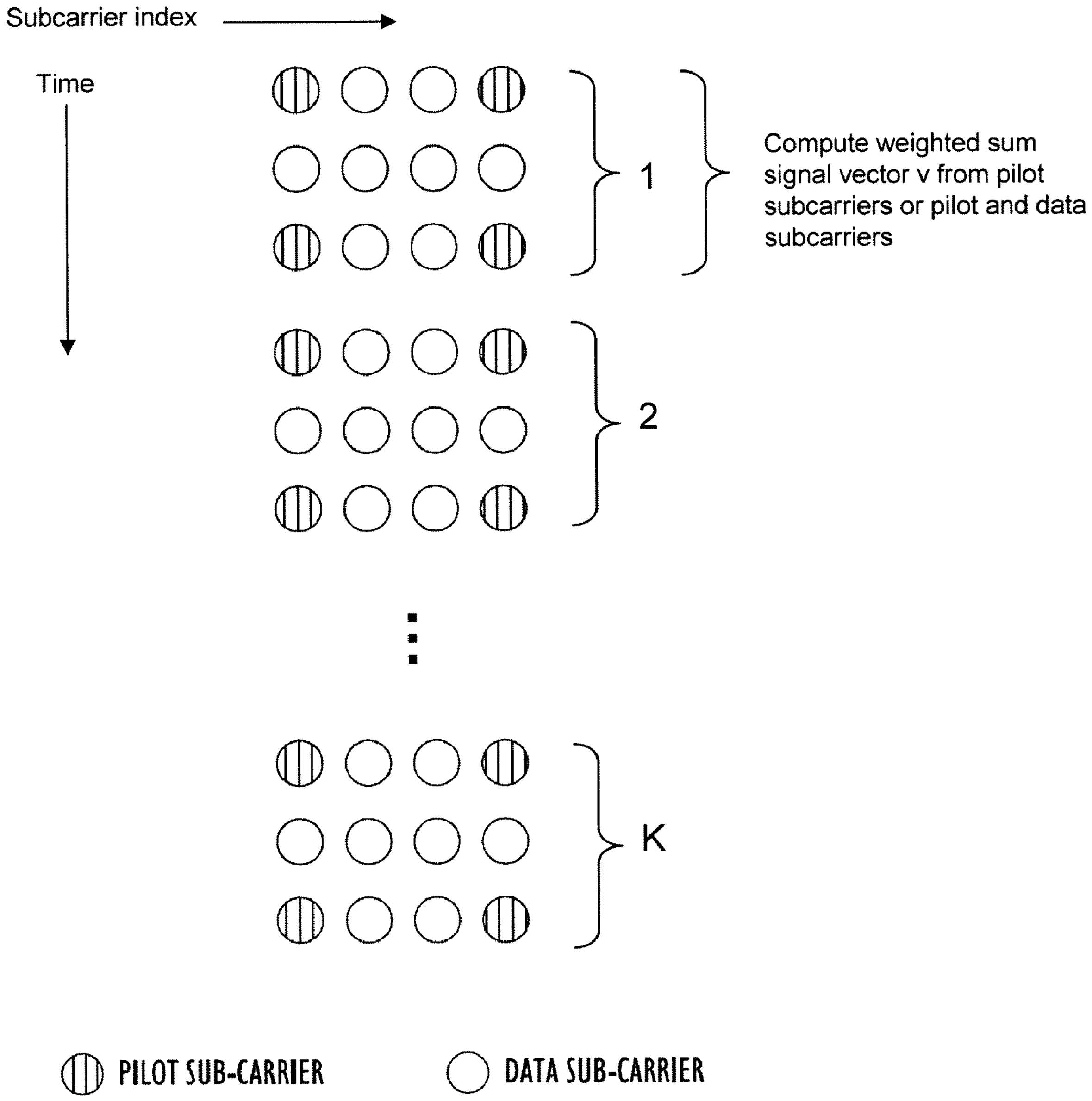
FIG. 5 is a diagram depicting configuration of adjacent groups of subcarriers from which information is computed by the combined receive beamforming and nulling process logic.

FIG. 5 is a diagram that depicts the configuration of K partial usage of subcarriers (PUSC) transmissions assigned to a given client device according to the WiMAX wireless communication standard. The weighted sum of signals vector v is computed from pilot subcarrier signals or pilot and data subcarrier signals contained in each PUSC transmission. The pilot subcarrier signal values are known in advance, whereas the data subcarrier values need to be recovered through decision feedback or other data detection and recovery techniques if the data values are to be included in the computation of the weighted sum signal vector v.

Referring back to FIG. 3, next, at 120, an estimated average covariance matrix is computed from the received signals Y. The covariance matrix is computed in a coherence block (a coherent frequency band or coherent time interval) from the pilot signals or from the recovered data signals. The covariance matrix is denoted R and is an M×M matrix, and the covariance matrix is computed as $R=YY^H$ or $R=\tilde{Y}\tilde{Y}^H$. Thus, like the weighted sum signal vector, the covariance matrix may be computed based on at least one of pilot signals known to be contained in the desired signals and data signals contained in the desired signals, which data signals are derived from decision feedback processing of the received signals.

At 125, M eigenvalues of corresponding M eigenvectors of the covariance matrix are computed. The M eigenvalues are denoted $\{\lambda_1, \lambda_2, \ldots, \lambda_M\}$ and are computed from the estimated average channel covariance R with $|\lambda_1| \geqq |\lambda_2| \geqq \ldots \geqq |\lambda_M|$, where $|\lambda_m|$ stands for the absolute value of the $m^{th}$ eigenvalue $\lambda_m$. The corresponding M eigenvectors are denoted $\{U_1, U_2, \ldots, U_M\}$, where the M by 1 vector $U_m$ is normalized as the Euclidean norm of vector $U_m$ is unity or $\|U_m\|=\sqrt{U_m^H U_m}=1$.

At 130, a correlation rate between the M eigenvectors and the weighted sum signal vector is computed. The correlation rate is computed as a vector referred to herein as a correlation rate vector. The correlation rate vector is denoted $r_m$, and is computed as $r_m=\text{abs}(U_m^H v)/\text{norm}(v)$, for $1 \leqq m \leqq M$, where abs( ) is the absolute operation and norm( ) is the Euclidean norm operation. Again, the correlation rate represents the normalized correlation value between the eigenvectors and the weighted sum signal vector v.

At 135, elements of the correlation rate vector are compared with a threshold. At 140, values for elements of a correlation rate adjustment vector are generated or set based on the comparison of corresponding elements of the correlation rate vector with the threshold. For example, when $r_m>f$, then a corresponding element of a correlation rate adjustment vector $c_m=1$ and otherwise $c_m=0$, where f is the threshold. The threshold f is, for example, a scalar between 0.05 to 0.1. In one example, f=0.05. Thus, the correlation rate adjustment vector is denoted $[c_1\ c_2 \ldots c_M]$, and the elements of the correlation rate adjustment vector serve as adaptive factors that are based on a correlation rate between the weighted sum signal vector v and the eigenvectors $\{U_m\}_{m=1}^M$. For example, the elements of the correlation rate adjustment vector $[c_1\ c_2 \ldots c_M]=[1\ 1\ 0 \ldots 0]$ for a low Doppler wireless environment where there are not significant differences between the weighted sum signal vector v and the M eigenvectors, and there is only one strong interfering signal.

At 145, the estimated combined receive beamforming and nulling weight vector W is computed based on the correlation rate adjustment vector. For example, the combined receive beamforming and nulling weight vector W is computed as:

$$W_1 = c_1 U_1(U_1^H v/\lambda_1) + c_2 U_2(U_2^H v/\lambda_2) + \ldots + c_M U_M(U_M^H v/\lambda_M) = \sum_{m=1}^{M} c_m U_m(U_m^H v/\lambda_m),$$

where $\lambda_1, \lambda_2, \ldots, \lambda_M$ are the M eigenvalues of the M eigenvectors $U_1, U_2, \ldots, U_M$, $[c_1\ c_2 \ldots c_M]$ is the correlation rate adjustment vector, v is the weighted sum signal vector and H denotes the Hermitian operation.

After computing the combined receive beamforming and nulling weight vector W, at 150, the combined receive beamforming and nulling weight vector W is applied to the received signals Y to produce receive beamformed signals y, where $y=W^H Y$. The combined receive beamforming and nulling weight vector W achieves two functions: (1) to generate a strong receive beam toward the desired signals; and (2) to null out or spatially filter out the interference signals.

At 155, the channel information is computed for the wireless channel between the base station and the wireless client device that is the source of the desired signals. This channel information is denoted $\hat{h}_1$ (with respect to user 1). After the beamforming weight vector is applied at function 150, the beamformed pilot subcarrier values are used to estimate the channel coefficients at each subcarrier using, for example, linear interpolation to compute channel coefficients at all subcarriers (e.g., non-pilot subcarriers) or other channel estimation methods. For example, the linear interpolation is used to estimate the channel coefficients in each subcarrier $\hat{h}(1)$, $\hat{h}(2)$, . . . $\hat{h}(z)$ for subcarriers 1 to z in each tile as $$\hat{h}(1) = h(1)$$

$$\hat{h}(2) = h(1) * \frac{2}{3} + h(4) * \frac{1}{3}$$

$$\hat{h}(3) = h(1) * \frac{1}{3} + h(4) * \frac{2}{3}$$

$$\hat{h}(4) = h(4)$$

At 160, the received symbols of the desired signals are estimated based on the receive beamforming and nulling weight vector, the receive signals and the estimated channel information. For example, the received symbols are recovered from the computation $\hat{d}_1=(W^H Y)\cdot/\hat{h}_1$. A "soft" demodulation method is used to calculate the log likelihood ratio (LLR) of each bit in the recovered received symbols $\hat{d}_1$.

In the case of a base station that communications with multiple wireless client stations, the base station computes a different receive beamforming and nulling weight vector W for each client device that it communicates with based on signals it received from the client device. At any given time, the receive beamforming and nulling weight vector W may vary depending on the nature of the interference occurring in the presence of "desired signals" being transmitted from a client device in the base station's cell to the base station.

The eigen-projection method described herein may be used in the base station or in a client device if the client device has multiple antennas. This method has a relatively low computation complexity for handling co-channel interference and it provides for efficient receive beamforming and nulling in frequency division duplex/time division duplex (FDD/TDD) multi-cell multiple-input multiple-output/multiple-input single-output/single-input multiple-output (MIMO/MISO/SIMO) wireless communication systems.

Figure 6:
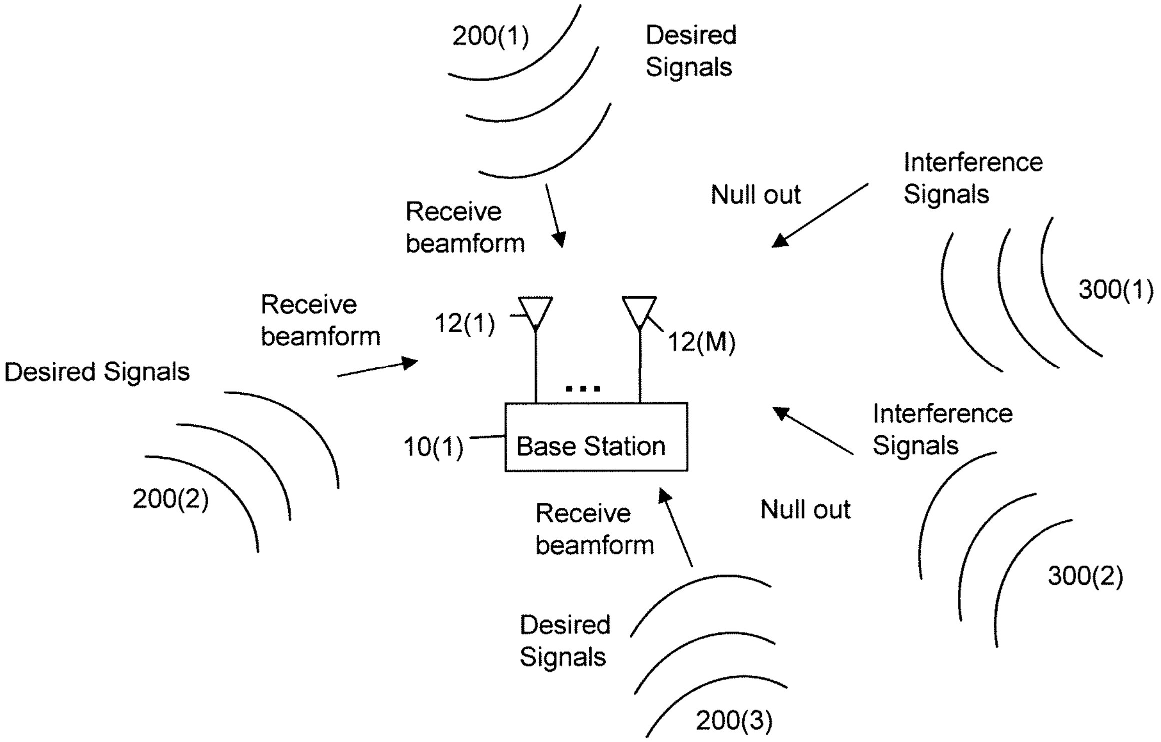
FIG. 6 is a block diagram that depicts operation of the combined receive beamforming and nulling process logic in a base station.

Turning to FIG. 6, an example of an application of the foregoing combined receive beamforming and nulling process is described. FIG. 6 shows a base station 10(1) that is configured with the receive beamforming and nulling process logic 100. The base station 10(1) may be receiving signals at any given time from a client device in its cell or coverage area. Thus, desired signals 200(1) represent signals from a first client device in the base station's cell, desired signals 200(2) represent signals from a second client device in the base station's cell and desired signals 200(3) represent signals from a third client device in the base station's cell. At the same time, the base station 10(1) may detect energy associated with interference signals that are in the same frequency channel in which the base station 10(1) is using to communicate with client devices in its cell. Such co-channel interfering signals are shown at 300(1) and 300(2), and as explained above, may result from transmission made by client devices or a base station in an adjacent cell on the same frequency channel as that used by base station 10(1).

The base station 10(1) generates a different receive beamforming and nulling weight vector when receiving each of the desired signals 200(1), 200(2) and 200(3). For example, the base station 10(1), through execution of the process logic 100 described herein performs the functions 115-160 with respect to each of the desired signals 200(1), 200(2) and 200(3) associated with corresponding ones of multiple wireless client devices in the coverage area of the base station 10(1). Thus, the base station 10(1) computes a first weight vector $W_1$ to receive beamform towards the desired signals 200(1) while nulling out the interfering signals 300(1) and 300(2), computes a second weight vector $W_2$ to receive beamform towards the desired signals 200(2) while nulling out the interfering signals 300(1) and 300(2) and computes a third weight vector $W_3$ to receive beamform towards the desired signals 200(3) while nulling out the interfering signals 300(1) and 300(2).

In the foregoing description, the beamforming weight vector is described in connection with a multi-cell wireless communication environment, such as that for use in FDD/TDD orthogonal frequency division multiple access (OFDMA) systems. However, these techniques may easily be extended for use in any multi-cell FDD/TDD wireless communication systems that use antenna arrays on a device on at least one side of the wireless link.

Although the apparatus, logic, and method are illustrated and described herein as embodied in one or more specific examples, it is nevertheless not intended to be limited to the details shown, since various modifications and structural changes may be made therein without departing from the scope of the apparatus, logic, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:

receiving at M plurality of antennas of a wireless communication device energy in a frequency band that includes desired signals and interference signals without knowledge of spatial signatures of the desired signals and interference signals, and generating received signals from the received energy;

computing a weighted sum signal vector from the received signals;

computing a covariance matrix from the received signals;

computing M eigenvalues of corresponding M eigenvectors of the covariance matrix;

computing a correlation rate between the M eigenvectors and the weighted sum signal vector;

computing a combined receive beamforming and nulling weight vector from the M eigenvectors and the weighted sum signal vector and based further on the correlation rate; and applying the combined receive beamforming and nulling weight vector to the received signals so as to receive beamform the desired signals and null out the interference signals.

2. The method of claim 1, wherein computing the weighted sum signal vector is based on at least one of pilot signals known to be contained in the desired signals and data signals contained in the desired signals, which data signals are derived from decision feedback processing of the received signals.

3. The method of claim 1, wherein computing the covariance matrix is based on at least one of pilot signals known to be contained in the desired signals and data signals contained in the desired signals, which data signals are derived from decision feedback processing of the received signals.

4. The method of claim 1, wherein computing the correlation rate comprises computing a correlation rate vector, and further comprising comparing elements of the correlation rate vector with a threshold.

5. The method of claim 4, and further comprising generating a correlation rate adjustment vector comprising elements whose values are based on comparison of corresponding elements of the correlation rate vector with the threshold.

6. The method of claim 5, wherein computing the combined receive beamforming and nulling weight vector comprises computing $W=c_1U_1(U_1^Hv/\lambda_1)+c_2U_2(U_2^Hv/\lambda_2)+\ldots+c_MU_M(U_M^Hv/\lambda_M)$, where $\lambda_1, \lambda_2, \ldots, \lambda_M$ are the M eigenvalues of the M eigenvectors $U_1, U_2, \ldots, U_M$, $[c_1\ c_2 \ldots c_M]$ is the correlation rate adjustment vector, v is the weighted sum signal vector and H denotes the Hermitian operation.

7. The method of claim 6, wherein computing the correlation rate vector comprises computing $r_m=\text{abs}(U_m^Hv)/\text{norm}(v)$, for $1\leqq m\leqq M$, where abs( ) is the absolute operation and norm( ) is the Euclidean norm operation.

8. The method of claim 7, wherein generating the correlation rate adjustment vector comprises comparing $r_m$ with the threshold and setting $c_m=1$ when $r_m$ is greater than the threshold and otherwise setting $c_m=0$.

9. The method of claim 8, wherein applying comprises computing $y=W^HY$, where Y denotes the received signals at the M plurality of antennas, and further comprising estimating channel information $\hat{h}_1$ for the desired signals and estimating receive symbol values $\hat{d}_1$ of the desired signals based on the receive beamforming and nulling vector W, the received signals Y and the estimated channel information $\hat{h}_1$ such that $\hat{d}_1=(W_1^HY)\cdot/\hat{h}_1$.

10. The method of claim 1, wherein the wireless communication device is a base station that serves multiple wireless client devices in a coverage area, and wherein receiving comprises receiving energy that contains desired signals transmitted from a wireless client device in the coverage area and the interference signals correspond to signals transmitted from devices outside of the coverage area but in the same frequency channel as that used in the coverage area.

11. The method of claim 10, wherein computing the weighted sum signal vector, computing the covariance matrix, computing the M eigenvalues and M eigenvectors, computing the correlation rate and computing the combined receive beamforming and nulling weight vector are performed with respect to desired signals associated with each of the multiple wireless client devices in the coverage area so as to produce a different combined receive beamforming and nulling weight vector for each of the multiple wireless client devices.

12. The method of claim 1, wherein computing the correlation rate comprises computing the correlation rate to represent a normalized correlation value between the M eigenvectors and the weighted sum signal vector.

13. An apparatus comprising:
- M plurality of antennas that are configured to detect energy in a frequency band;
- a receiver that is configured to generate received signals from the energy detected in the frequency band, wherein the energy comprises desired signals and interference signals;
- a controller that is configured to:
  - compute a weighted sum signal vector from the received signals;
  - compute a covariance matrix from the received signals;
  - compute M eigenvalues of corresponding M eigenvectors of the covariance matrix;
  - compute a correlation rate vector that represents a correlation rate between the M eigenvectors and the weighted sum signal vector;
  - compute a combined receive beamforming and nulling weight vector from the M eigenvectors and the weighted sum signal vector and based further on the correlation rate; and
  - apply the combined receive beamforming and nulling weights to the received signals.

14. The apparatus of claim 13, wherein the controller is further configured to compare elements of the correlation rate vector with a threshold, and to generate a correlation rate adjustment vector comprising elements whose values are set based on the comparison of corresponding elements of the correlation rate vector with a threshold.

15. The apparatus of claim 14, wherein the controller is configured to compute the combined receive beamforming weight vector as $W=c_1U_1(U_1^Hv/\lambda_1)+c_2U_2(U_2^Hv/\lambda_2)+\ldots+c_MU_M(U_M^Hv/\lambda_M)$, where $\lambda_1, \lambda_2, \ldots, \lambda_M$ are the M eigenvalues of the M eigenvectors $U_1, U_2, \ldots, U_M$, $[c_1\ c_2 \ldots c_M]$ is the correlation rate adjustment vector, v is the weighted sum signal vector and H denotes the Hermitian operation.

16. The apparatus of claim 15, wherein the controller is configured to compute the correlation rate vector $r_m=\text{abs}(U_m^Hv)/\text{norm}(v)$, for $1\leqq m\leqq M$, where abs( ) is the absolute operation and norm( ) is the Euclidean norm operation.

17. The apparatus of claim 16, wherein the controller is configured compare the vector $r_m$ with the threshold and to set $c_m=1$ when $r_m$ is greater than the threshold and otherwise to set $c_m=0$.

18. The apparatus of claim 17, wherein the controller is configured to apply the combined receive beamforming weight vector by computing $y=W^HY$, where Y denotes the received signals at the M plurality of antennas, to estimate channel information $\hat{h}_1$ for the desired signals and to estimate receive symbol values $\hat{d}_1$ of the desired signals based on the receive beamforming and nulling vector W, the received signals Y and the estimated channel information $\hat{h}_1$ such that $\hat{d}_1=(W_1^HY)\cdot/\hat{h}_1$.

19. The apparatus of claim 13, wherein the receiver is configured to receive energy that contains desired signals transmitted from a wireless client device in a coverage area and the interference signals correspond to signals transmitted from devices outside of the coverage area but in the same frequency channel as that used in the coverage area.

20. The apparatus of claim 19, wherein the controller is configured to compute the weighted sum signal vector, compute the covariance matrix, compute the M eigenvalues and M eigenvectors, compute the correlation rate vector and compute the combined receive beamforming and nulling weight vector with respect to desired signals associated with each of multiple wireless client devices in the coverage area so as to produce a different combined receive beamforming and nulling weight vector for each of the multiple wireless client devices.

21. The apparatus of claim 13, wherein the controller is configured to compute the combined receive beamforming and nulling weight vector without knowledge of the spatial signatures of the desired signals and of the interference signals.

22. One or more non-transitory tangible processor readable media encoded with instructions for execution by a processor and when executed operable to:
- compute a weighted sum signal vector from received signals associated with energy detected at M plurality of antennas of a wireless communication device, wherein the energy comprises desired signals and interference signals;
- compute a covariance matrix from the received signals;
- compute M eigenvalues of corresponding M eigenvectors of the covariance matrix;
- compute a correlation rate vector that represents a correlation rate between the M eigenvectors and the weighted sum signal vector;

compute a combined receive beamforming and nulling weight vector from the M eigenvectors and the weighted sum signal vector and based further on the correlation rate; and apply the combined receive beamforming and nulling weight vector to the received signals.

23. The non-transitory tangible processor readable media of claim 22, and further comprising instructions that, when executed by a processor, are operable to compare elements of the correlation rate vector with a threshold, and to generate a correlation rate adjustment vector comprising elements whose values are set based on the comparison of corresponding elements of the correlation rate vector with a threshold.

24. The non-transitory tangible processor readable media of claim 23, wherein the instructions that, when executed by the processor, are operable to compute the combined receive beamforming weight vector comprise instructions operable to compute the combined receive beamforming weight vector as $W=c_1U_1(U_1^Hv/\lambda_1)+c_2U_2(U_2^Hv/\lambda_2)+ \ldots +c_MU_M(U_M^Hv/\lambda_M)$, where $\lambda_1, \lambda_2, \ldots, \lambda_M$ are the M eigenvalues of the M eigenvectors $U_1, U_2, \ldots, U_M$, $[c_1\ c_2 \ldots c_M]$ is the correlation rate adjustment vector, v is the weighted sum signal vector and H denotes the Hermitian operation.

25. The non-transitory tangible processor readable media of claim 24, wherein the instructions that, when executed by the processor, are operable to compute the correlation vector comprise instructions that, when executed by the processor, are operable to compute the correlation rate vector $r_m=abs(U_m^Hv)/norm(v)$, for $1 \leqq m \leqq M$, where abs( ) is the absolute operation and norm( ) is the Euclidean norm operation.

26. The non-transitory tangible processor readable media of claim 22, wherein the instructions that, when executed by the processor, are operable to compute the combined receive beamforming and nulling weight vector comprise instructions that cause the processor to compute the combined receive beamforming and nulling weight vector without knowledge of the spatial signatures of the desired signals and of the interference signals.

* * * * *